Dec. 10, 1963   A. N. PRATER ETAL   3,113,875
METHOD OF DEHYDRATING ONION FRAGMENTS
Filed Oct. 2, 1959   2 Sheets-Sheet 1
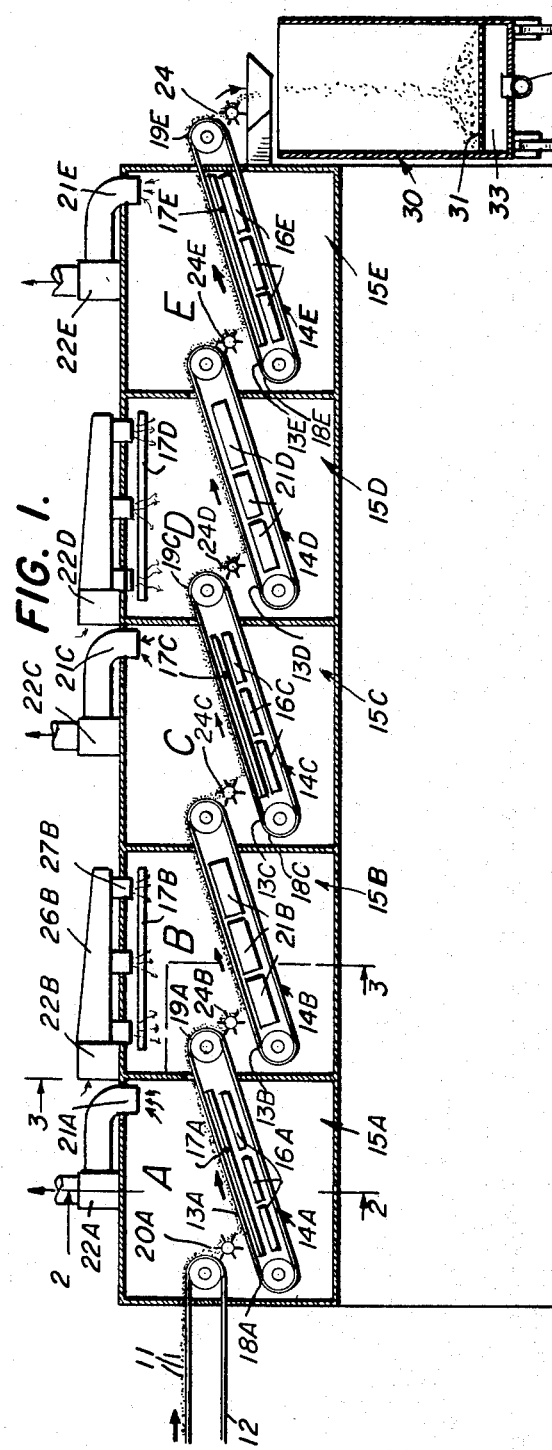
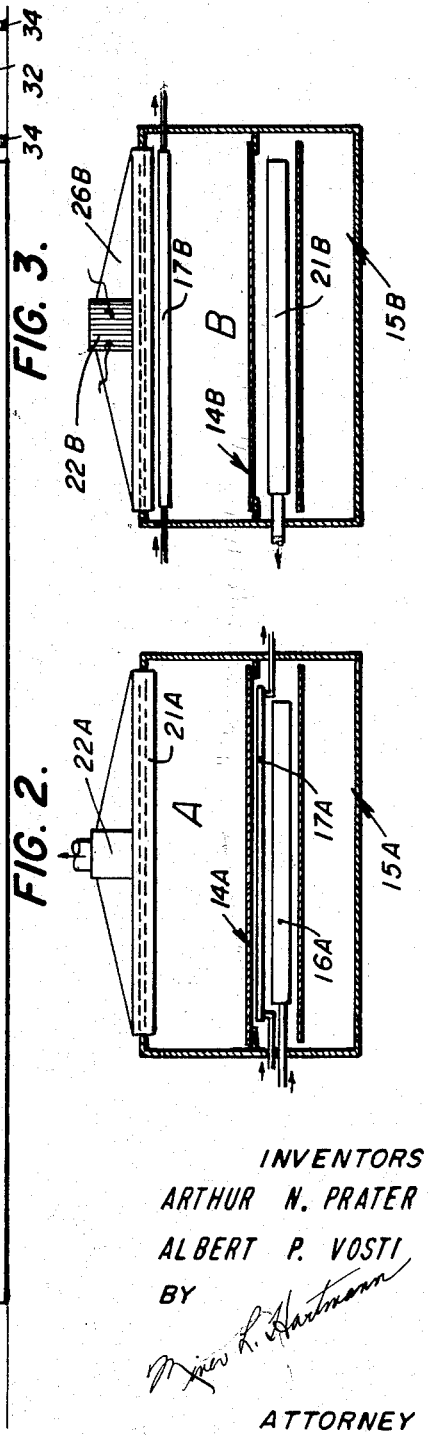
INVENTORS
ARTHUR N. PRATER
ALBERT P. VOSTI
BY
ATTORNEY Dec. 10, 1963   A. N. PRATER ETAL   3,113,875
METHOD OF DEHYDRATING ONION FRAGMENTS
Filed Oct. 2, 1959   2 Sheets-Sheet 2

INVENTORS
ARTHUR N. PRATER
ALBERT P. VOSTI
BY

ATTORNEY

3,113,875
METHOD OF DEHYDRATING ONION FRAGMENTS

Arthur N. Prater, Sherman Oaks, and Albert P. Vosti, Gilroy, Calif., assignors to Gentry Division, Consolidated Foods Corporation, a corporation of Maryland
Filed Oct. 2, 1959, Ser. No. 844,026
6 Claims. (Cl. 99—204)

This invention relates to dehydrated onion in the form of curled, twisted and crinkled fragments, and to a new method for drying sliced or fragmented onions to produce crimpled onion fragments.

Onion slices have heretofore been dehydrated to produce a stable dry product which may be reconstituted with water to form slices or portions of slices which simulate the concentric ring structure of the fresh onion. The reconstituted product maitains to some degree the natural structure of the onion, for example when sliced perpendicular to its natural axis, the concentric ring structure (at least in part) is maintained during the drying procedure, and when the dehydrated product is rehydrated, the characteristic onion ring structure (or recognizable fragments thereof) results.

In accordance with the old art, the slices of onion are placed flat and as far as possible in unbroken slices in thin layers on foraminous trays or upon a foraminous conveyor belt, and are slowly dried by passing dry warm air through and over the trays or belt. To attain the desired dehydrated flat slices or part slices, in accordance with the old art, a closely controlled long drying schedule was required, the initial drying being at slowly decreasing temperatures in the range from 180° to 140° over a long period of time. The slices are purposely left undisturbed during the inntial drying, during which the surface moisture or juice upon evaporation cements the onion parts together and maintains the slices flat as whole or large fragments. The slow undisturbed drying with decreasing temperatures is a necessary condition not only for the production of large flat slices or parts of slices, but also for the prevention of darkening of the product.

The flat partly-dried slices are scraped from the foraminous surfaces when the pieces are dry enough and strong enough to maintain their shape. They are frequently stuck together and must be broken up and redistributed on another foraminous surface—a tray or movable belt, or in bins—and further dried at a rate which does not change the physical shape characteristics of the pieces. The onion pieces may again be removed from the drying surface and redistributed on a third drying foraminous surface, with dry air being again circulated through the mass. The final stage reduces the average moisture to 8% to 15% B.D.B. (bone-dry-basis) in a total time of 2 to 8 hours depending, of course, upon the many practical variables, such as depth of drying layers, temperature, humidity, and volume of the drying air. This close control of drying rate and the long time of drying increases the cost of dehydrating the onion slices.

We have discovered that the total drying time for making dehydrated onion pieces may be greatly reduced and a new crimpled dehydrated onion product produced which is not in flat pieces and is much less compact in character, and has other improved qualities, by initially dehydrating the onion slices rapidly with stirring of the pieces to prevent adherence of the fragments. For example, frequent short drying sequences while the material rides on foraminous belts may be employed, with rearrangement of the partly-dried product at the end of each of several short drying sequences. The same results may be attained by initially surface drying the slice fragments while they are suspended in and transported by a warm drying gas medium.

The onion pieces made by this method of dehydration are preferably pieces of the separated rings produced by slicing the onion substantially perpendicular to its axis. These naturally arcuate pieces, when rapidly dried as described, crinkle, curl and twist into irregular elongated pieces which in bulk pack loosely together. This particular shape factor is advantageous not only in carrying out the short, successive drying sequences as described, but also in the final bin drying step of the dehydrating process, in which the moisture is reduced to a standard acceptable average percentage, and the moisture content throughout a batch and throughout each individual piece is brought to a uniform selected dryness, this being essential for preservation of the dehydrated product. This final step is accomplished by slowly passing drying air at about room temperature through a mass of the pre-dried pieces in a portable bin, as will be described, the twisted and curled form permitting easy passage of the air throughout the mass. Because of their twisted and curled shapes, the crimpled onion pieces do not pack together and therefore are readily reconstituted by immersion in water, requiring no breaking up to effect contact with the water. The weight per gallon of the crimpled onion product is only about two thirds that of the ordinary dehydrated chopped onion, which averages about 2.0 to 2.1 pounds per gallon.

When the slicing of the onion is in random planes, many of the separated "rings" are similar to those described as preferred but less regular in length and thickness, and these fragments twist and curl in substantially the same way as preferred pieces. The term "onion-slice fragment" as herein used is intended to include the arcuate pieces of onion rings produced by slicing the onion, regardless of the angle of slicing.

The process for making crimpled dehydrated onion fragments may be carried out in several kinds of dryers, two examples of which are shown in diagrammatic form in the drawings, on which FIG. 1 is a side elevational view partly in section showing schematically, a preferred form of dryer for producing crimpled onions;

FIG. 2 is a cross sectional view taken on the line 2—2 of FIG. 1;

FIG. 3 is a cross-sectional view taken on the line 3—3 of FIG. 1;

Figure 4:
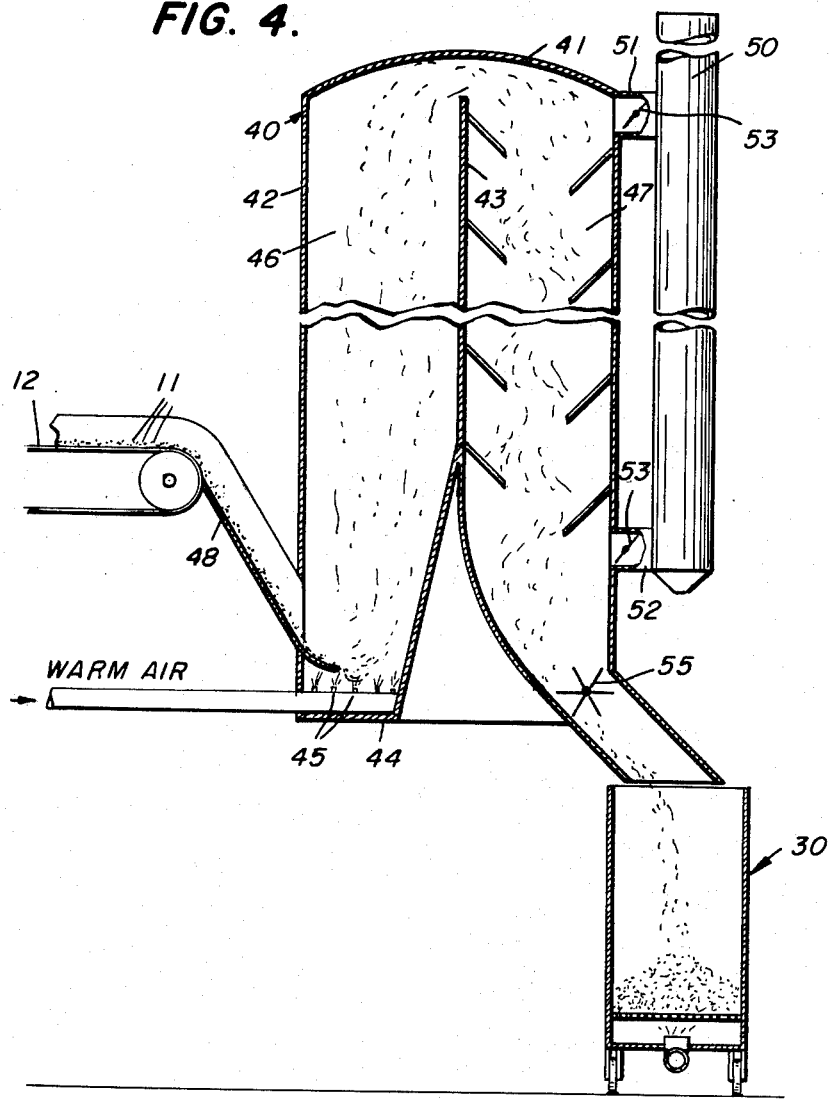
FIG. 4 is a side elevational view partly in section showing schematically an alternative form of dryer for producing crimpled onions.
Figure 5:
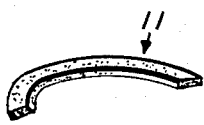
FIG. 5 is a perspective view of a natural slice arcuate segment of an onion.
Figure 6:
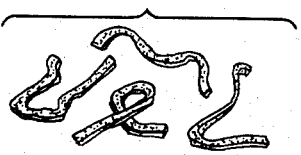
FIG. 6 is a perspective view of several pieces of my crimpled dehydrated onion.

Referring to FIGS. 1 to 3, a succession of relatively short conveyor belt drying units A, B, C, D and E are represented, these units providing alternately for up or down movement of the drying air through the conveyor belt. In units A (as well as C and E) the drying air is introduced through ducts 16A, 16C, and 16E disposed respectively below the top runs 13A, 13C and 13E of the inclined conveyor belt 14A, 14C and 14E respectively, there being a grid of heating coils 17A, 17C and 17E respectively through which the air passes before flowing through the foraminous belt 14A, 14C and 14E respectively upon which the slices or fragments of onion are carried from the feed end 18A to the discharge end 19A of the drier compartment enclosure 15A, from the feed end 18C to the discharge end 19C of the drier compartment 15C, and from the feed end 18E to the discharge end 19E of the drier compartment 15E, respectively. The heated gas, after passing through the belts 14A, 14C and 14E respectively and the raw onion slices and fragments 11 thereon, is carried out, respectively through the exhaust pipes 21A, 21C and 21E, each of which communicates with the suction side of the exhaust blowers 22A, 22C and 22E. The slice fragments are brought to the dryer unit A by a feed conveyor 12, and distributed onto the feed end of the conveyor belt 14A by a feeder 20A. The partly dried onion fragments are discharged from the elevated discharge end of the conveyor belt 14A and 14C, respectively, onto the feed end of the next conveyor belt 14B or 14D of a down draft dryer unit, B or D. A doffer or pin breaker 24B, 24C, 24D, and 24E is operatively positioned at the discharge end of each preceding conveyor 14A, 14B, 14C, and 14D respectively to remove any partly dried fragments of onion which may have adhered to the conveyor belt, and drop the fragments on the upper surfaces 13B, 13C, 13D, and 13E respectively of the conveyor belts 14B, 14C, 14D, and 14E respectively.

In the dryer units B and D in the enclosures 15B and 15D, the blower 22B or 22D respectively forces air through the header pipe 26B and 26D with outlet ports 27B and 27D through heater coils 17B and 17D disposed above the conveyor belt 14B and 14D, all respectively. After the heated air passes through the onion fragments respectively on the conveyor belt 14B and 14D, it is removed through the exhaust pipes 21B and 21D disposed below the top surface of the conveyor belt 14B or 14D, all respectively. The conveyor belts 14B and 14D are elevated at their discharge ends, so that the further dried onion fragments are removed as before by doffers 24C and 24D and dropped onto the conveyor belts 14C and 14E, all respectively, of the next dryer units in the sequence.

The succeeding units C, D and E operate respectively as described above, the fragments being discharged from the end of the final conveyor belt 14E over the doffer 24 into a deep drying bin 30, which is provided with a false bottom 31, with pipe 32 communicating with the air chamber 33 below the false bottom 31. The drying bin 30 is preferably provided with rollers 34 for moving the bins to another location where the pipe 32 is connected to a source of dry air at about room temperature. The crimpled onion-slice fragments are then subjected to a slow equalizing drying action until the moisture content is uniform throughout each fragment and each batch, the optimum moisture being about 4 percent (B.D.B.).

The temperatures and times in each of the conveyor drying units may be varied over wide ranges, depending upon the volume and humidity of the drying air, thickness of the layer of onion fragments, and other practical variables. It is important to produce the crimpled onions that the partly dried pieces be disturbed, rolled and twisted while in the semi-plastic state of partial drying. In one setup, the units required an average total time of about 11 minutes per cycle, and the temperature decreased from 160° F. in unit A to 130° in unit E. The product contained from 8 to 12 percent moisture (B.D.B.) on the average. By the process of making dehydrated onion slices, in the usual process which avoids conditions which result in crimpling, the total time cycle at the same temperature range is from 2 to 4 hours.

The crimpled onion-slice fragments may also be prepared by propelling the fragments through a dryer chamber by means of a drying air blast. As shown in FIG. 4, the air conveying drier 40 consists of a tall chamber having a dome 41 over side walls 42, there being a vertical dividing partition 43 extending from the base 44 nearly to the dome. Air blast nozzles 45 communicate with a source of hot dry air under a pressure and of volume sufficient to lift the freshly cut onion slices and fragments up through the ascending drying chamber 46, the onion fragments being delivered by feed conveyor 12 into a chute 48 directing the fragments over nozzles 45. The slices are torn apart and the fragments, while being surface dried, are pneumatically carried over the partition 43, and drop through the descending drying chamber or settling zone 47, where the drying continues, the air being removed through the stack 50 which is connected at two or more levels by exhaust pipes 51 and 52, each having a control damper 53.

The surface dried onion fragments, having a moisture content of about 12 percent B.D.B., collect in the bottom of the descending chamber 47 and are discharged through the rotary seal 55 into a deep drying bin 30 similar to that previously described. The moisture content of the partly dried crimpled onion slice fragments are reduced to the uniform optimum of 4 percent (B.D.B.).

The advantages of our invention will be understood from the above description. The new process results in a physical form of dehydrated onion-slice fragments which provides advantages in processing and in use. The crimpled, partly dehydrated onion fragments do not pack tightly together and therefore permits the better circulation of drying gases during the process steps following the first step in which the fragments are surface dried. The crimpled, dehydrated onions do not require sizing and are more readily rehydrated than are the flat dehydrated slices. The shorter time of drying reduces the cost of dehydrating.

We claim:
1. In the process of dehydrating onion-slice fragments by subjecting them to circulated heated drying gases at a temperature which does not heat the fragments in excess of the range from about 130° to 160° F., the step comprising initially drying the outer surfaces of said fragments at such rapid rate that the fragments become crimpled and the surface moisture is so low that the fragments remain distinct and do not adhere to each other.

2. In the process of dehydrating onion-slice fragments by subjecting them to circulated heated drying gases at a temperature which does not heat the fragments in excess of the range from about 130° to 160° F., the step comprising initially agitating said fragments while rapidly drying the outer surfaces thereof whereby the fragments are crimpled and the surface moisture is so low that the fragments remain distinct and do not adhere to each other.

3. The process of dehydrating onion-slice fragments comprising forming a layer of freshly cut onion-slice fragments passing heated gaseous drying medium at a temperature which does not heat the fragments in excess of the range from about 130° to 160° F. through said layer at a rate rapid enough to produce turbulence in said layer of fragments and quick surface drying whereby adherence together of fragments is avoided, and crimpling of said onion-slice fragments results, repeatedly rearranging said layer of crimpled fragments and passing heated gaseous drying medium through said rearranged layers until the moisture of said dehydrated fragments has been reduced to about 8 to 12 percent, bone-dry basis.

4. The process of dehydrating onion-slice fragments comprising forming a layer of freshly cut onion-slice fragments passing heated gaseous drying medium at a temperature which does not heat the fragments in excess of the range from about 130° to 160° F. through said layer at a rate which produces turbulence in said layer of fragments and quick surface drying whereby adherence together of fragments is avoided, and crimpling of said onion-slice fragments results, repeatedly rearranging said layer of crimpled fragments and passing heated gaseous drying medium through said rearranged layers until the moisture of said partly dehydrated fragments has been reduced to about 8 to 12 percent, bone-dry basis; collecting said partly dehydrated and crimpled fragments in a thick mass, and slowly passing drying air through said mass of crimpled onion fragments until a uniform moisture content of about 4 percent, bone-dry basis has been attained.

5. The process of dehydrating onion-slice fragments comprising delivering a stream of freshly cut onion-slice fragments into an upwardly directed stream of heated gaseous drying medium having a temperature which does not heat the fragments above the range from about 130° to 160° F., at a rate which produces surface drying and crimpling of said onion-slice fragments and a surface moisture so low that the fragments remain distinct and do not adhere to each other, pneumatically elevating said crimpled fragments into a settling zone, and collecting said partly dried crimpled onion-slice fragments at the bottom of said zone, the average moisture of said collected crimpled onion-slice fragments being not greater than about 12 percent, bone-dry basis.

6. The process of dehydrating onion-slice fragments comprising delivering a stream of freshly cut onion-slice fragments into an upwardly directed stream of heated gaseous drying medium whereby to separate said fragments and quickly surface dry them whereby to produce crimping, and further drying said onion-slice fragments to a moisture content of about 8 to 12 percent, bone-dry basis, pneumatically elevating said crimpled fragments into a settling zone, collecting said crimpled onion-slice fragments in a deep-layer, and then passing drying gas at about room temperature through said partly dried crimpled onion-slice fragments until said crimpled onion fragments have a moisture content of about 4 percent bone-dry basis.

References Cited in the file of this patent

UNITED STATES PATENTS

| | | |
|---|---|---|
| 1,929,437 | McComb | Oct. 10, 1937 |
| 2,406,431 | Miller | Aug. 27, 1946 |
| 2,799,096 | Scott | July 16, 1957 |

OTHER REFERENCES

"Drying and Dehydration of Foods," 1943, by H. W. Von Loesecke, published by Reinhold Publishing Corporation, 330 W. 42nd St., New York, pages 105, 106, and 107, article entitled "Onions."